United States Patent [19]
Chang

[11] Patent Number: 6,075,642
[45] Date of Patent: Jun. 13, 2000

[54] MULTI-PORT OPTICAL ISOLATOR

[75] Inventor: Kok-Wai Chang, Sunnyvale, Calif.

[73] Assignee: Hewlett-Packard Company, Palo Alto, Calif.

[21] Appl. No.: 09/100,200

[22] Filed: Jun. 18, 1998

[51] Int. Cl.[7] .............................. G02B 5/30; G02B 6/26; G02B 6/32; G02F 1/09
[52] U.S. Cl. .................... 359/281; 359/282; 359/484; 359/495; 359/497; 372/703; 385/11; 385/24; 385/33; 385/73; 385/74
[58] Field of Search .................... 359/281, 282, 359/484, 495, 497, 900; 372/703; 385/6, 11, 24, 31, 33, 73, 74, 78

[56] References Cited

U.S. PATENT DOCUMENTS

| | | | |
|---|---|---|---|
| 4,178,073 | 12/1979 | Uchida et al. | 350/151 |
| 4,239,329 | 12/1980 | Matsumoto | 350/96.15 |
| 5,040,863 | 8/1991 | Kawakami et al. | 359/484 |
| 5,204,771 | 4/1993 | Koga | 359/281 |
| 5,204,923 | 4/1993 | Grasso et al. | 385/24 |
| 5,317,655 | 5/1994 | Pan | 385/11 |
| 5,319,483 | 6/1994 | Krasinski et al. | 359/113 |
| 5,359,689 | 10/1994 | Iwatsuka et al. | 385/33 |
| 5,384,874 | 1/1995 | Hirai et al. | 385/11 |
| 5,446,578 | 8/1995 | Chang et al. | 359/495 |
| 5,471,340 | 11/1995 | Cheng et al. | 359/281 |
| 5,546,219 | 8/1996 | Iida | 359/484 |
| 5,559,633 | 9/1996 | Emkey | 359/484 |
| 5,574,596 | 11/1996 | Cheng | 359/484 |
| 5,642,447 | 6/1997 | Pan et al. | 385/11 |
| 5,689,359 | 11/1997 | Kurata et al. | 359/497 |
| 5,706,371 | 1/1998 | Pan | 385/11 |
| 5,734,763 | 3/1998 | Chang | 385/11 |
| 5,808,793 | 9/1998 | Chang et al. | 359/484 |
| 5,930,418 | 7/1999 | Chang | 385/11 |
| 5,991,076 | 11/1999 | Cheng | 359/495 |
| 6,014,244 | 1/2000 | Chang | 359/281 |
| 6,014,475 | 1/2000 | Frisken | 359/281 |

FOREIGN PATENT DOCUMENTS

| | | | |
|---|---|---|---|
| 0159245 | 12/1979 | Japan | 359/484 |
| 55-113020 | 9/1980 | Japan | 359/484 |
| 59-22026 | 2/1984 | Japan | 359/484 |
| 60-130934 | 7/1985 | Japan | 359/484 |
| 61-121027 | 6/1986 | Japan | 359/484 |
| 0185518 | 7/1989 | Japan | 359/484 |
| 4073712 | 3/1992 | Japan | 359/484 |
| 6148569 | 5/1994 | Japan | 372/703 |

*Primary Examiner*—Ricky D. Shafer

[57] ABSTRACT

An optical nonreciprocal apparatus, preferably an optical isolator, and a method of isolating propagation of light signals from multiple input optical fibers to multiple output optical fibers utilize compact isolator chips formed by a nonreciprocal rotator assembly that is sandwiched between two walk-off crystals. The nonreciprocal rotator assembly provides 90° rotation of polarization components of forward propagating light beams, while providing 0° rotation for rearward propagating light beams. In one embodiment, the optical nonreciprocal apparatus includes two isolator chips between an array of lenses to provide two-stage optical isolator. Preferably, the walk-off crystals in the second isolator chip provide displacement of aligned polarization components of forward propagating light beams in a direction that is perpendicular to the walk-off directions of the walk-off crystals in the first isolator chip. In another embodiment, the array of lenses are replaced by two converging lenses that are arranged in optical series. The first lens inversely project parallel light beams onto the second lens, in a diverging manner.

14 Claims, 13 Drawing Sheets

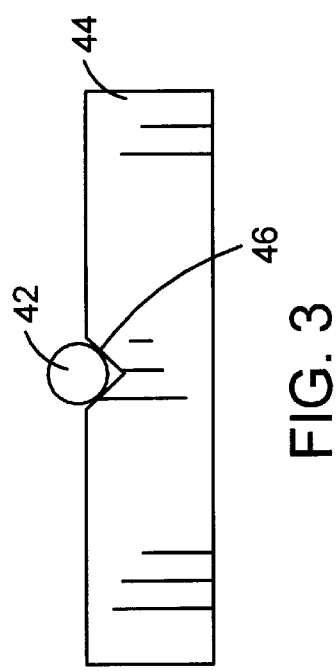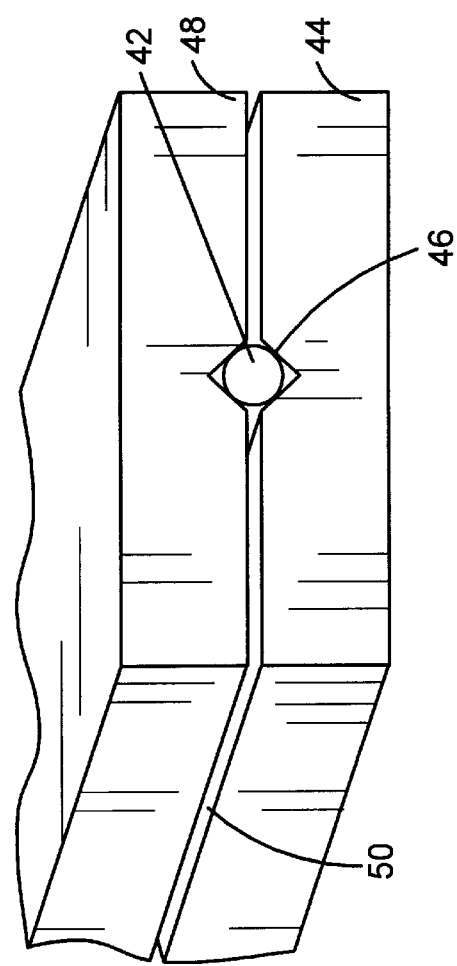

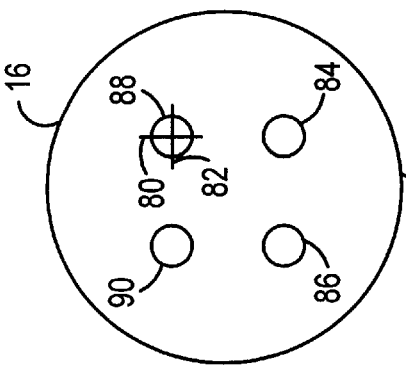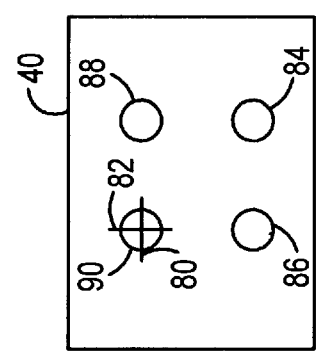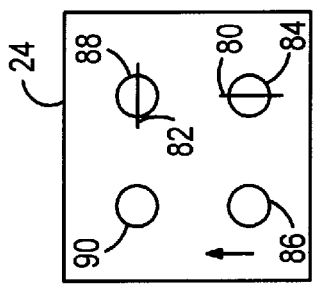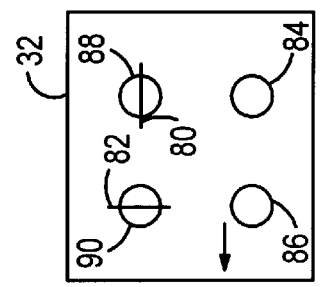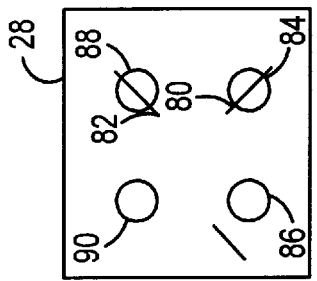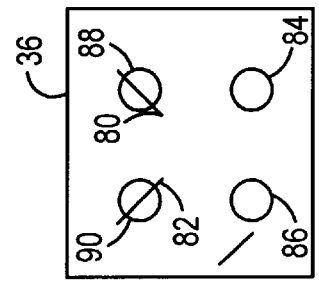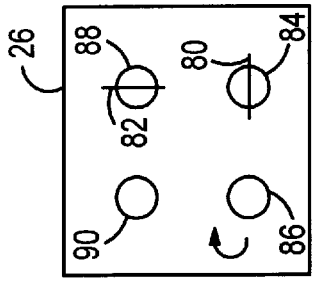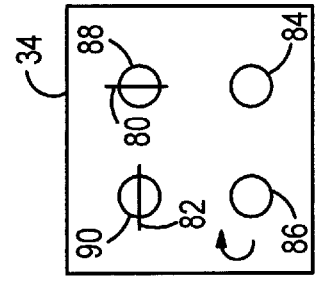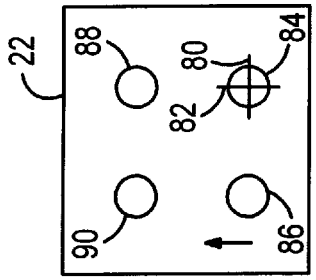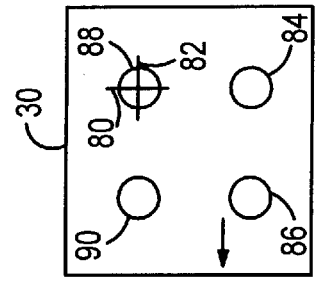

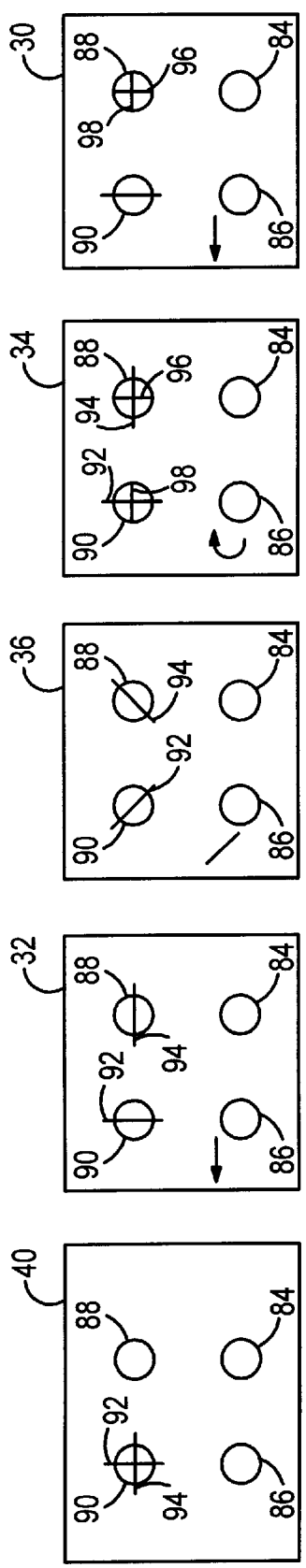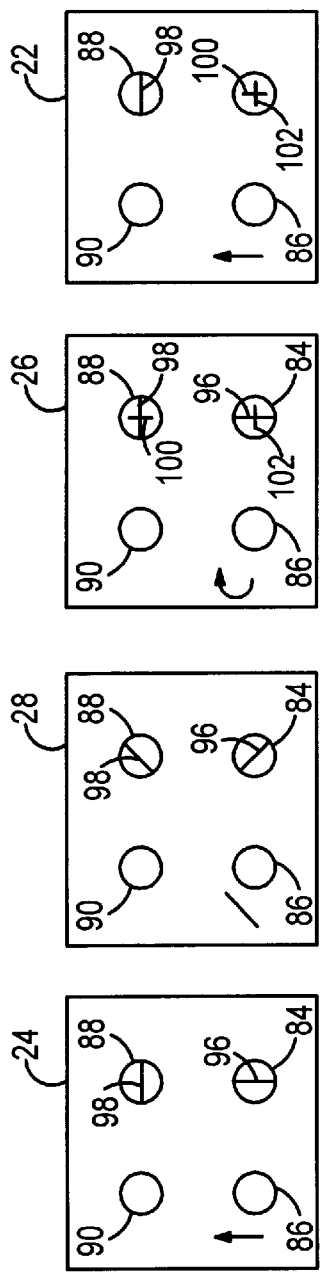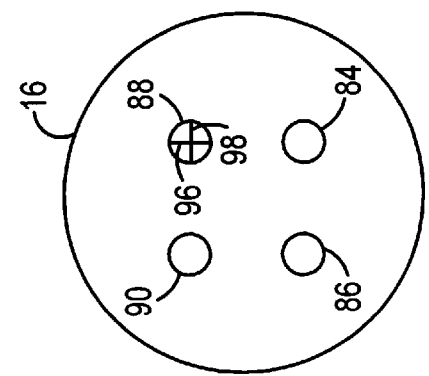

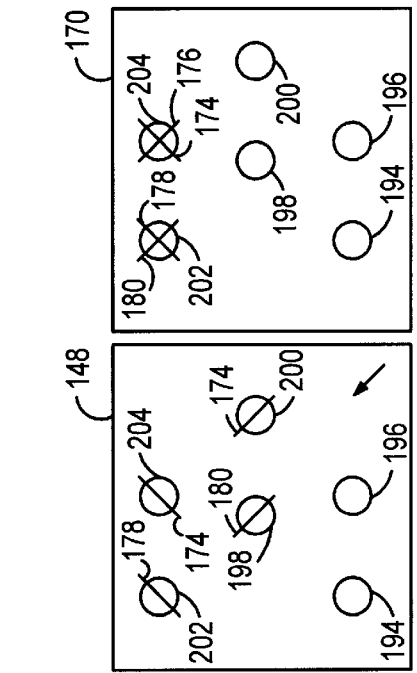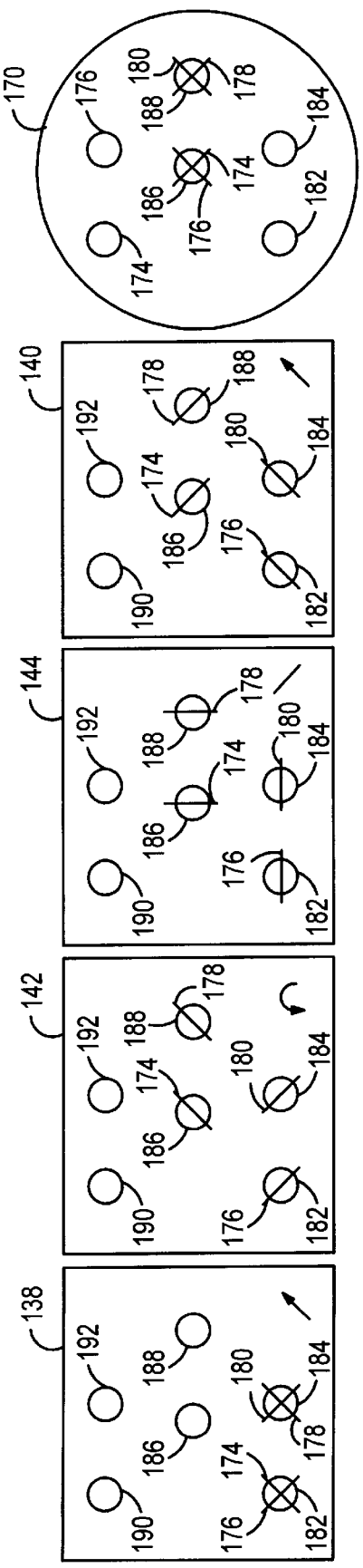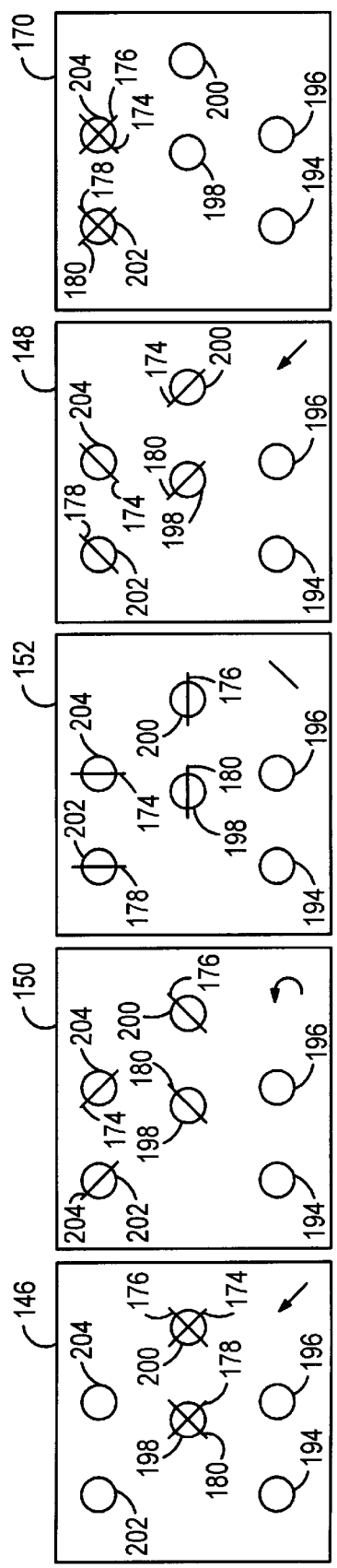

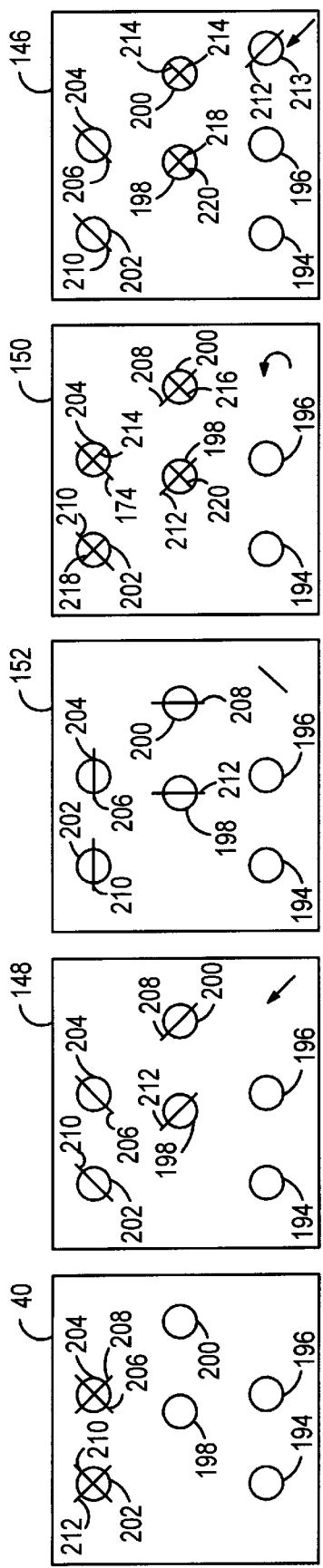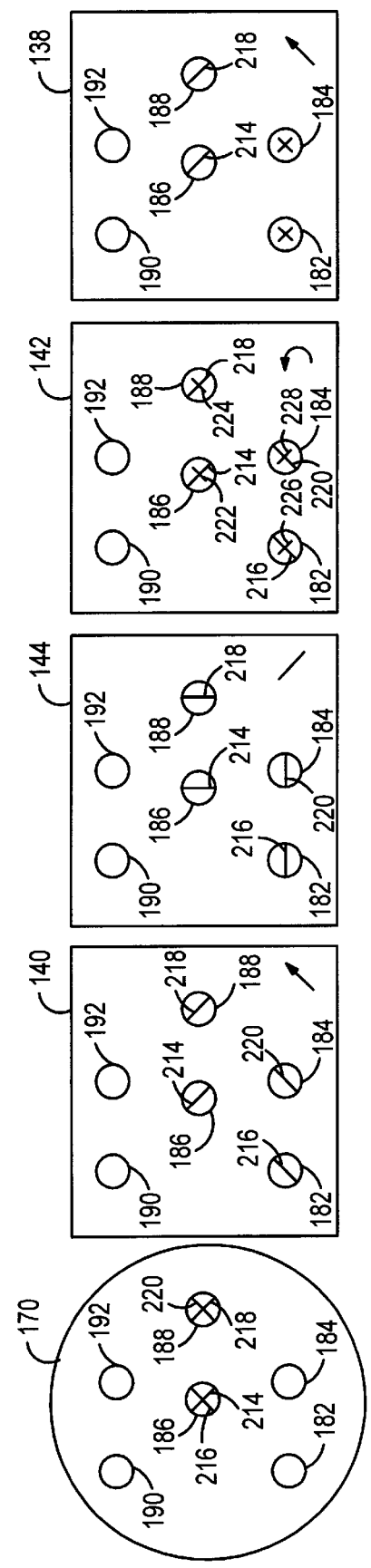

MULTI-PORT OPTICAL ISOLATOR

TECHNICAL FIELD

The invention relates generally to nonreciprocal optical devices and more particularly to an optical isolator that can accommodate multiple optical fibers.

DESCRIPTION OF THE RELATED ART

Continuing innovations in the field of fiber optic technology have contributed to the increasing number of applications of fiber optics in different technologies. The flexibility and reliability of communication networks based upon transmission of light signals via optical fibers are greatly increased by the availability of assemblies such as optical circulators and isolators. Optical circulators enable a bidirectional fiber to be coupled to both an input optical fiber and an output optical fiber. Optical isolators provide forward propagation of light signals from an input optical fiber to an output optical fiber, while inhibiting light from propagating in the rearward direction from the output optical fiber back through the input optical fiber.

An optical isolator may couple single-mode fibers. An input fiber directs light signals into an optical assembly that splits the signal into polarization components, performs nonreciprocal operations on the components, and recombines the components for output at an output fiber. The nonreciprocal operations are designed to reduce the likelihood that back-directed light will be aligned with the input fiber.

U.S. Pat. No. 4,178,073 to Uchida et al. describes a single-stage optical isolator utilizing a Faraday rotator and a half-wave plate that are arranged between two birefringent crystals. The first birefringent crystal has a walk-off direction to the right, while the walk-off direction of the second birefringent crystal is to the left with respect to forward propagating direction. In operation, a forward propagating light beam exits from an input optical fiber and impinges on the first birefringent crystal. The aligned polarization component, i.e., horizontal polarization component, of the light beam is separated from the vertical polarization component by the first birefringent crystal. An aligned polarization component is defined here as a polarization component that is parallel to a walk-off direction of a birefringent crystal. The two polarization components are then rotated by the Faraday rotator and the half-wave plate. Next, the polarization components are recombined by the second birefringent crystal, aligning the light beam to an output optical fiber for successful transmission. In a rearward propagation, a light beam is affected by the birefringent crystals in a reciprocal manner. However, due to the non-reciprocal operation of the Faraday rotator, the polarization components of the light beam are effectively rotated by 0° in the rearward direction. The nonrotation causes the polarization components to misalign with the input optical fiber, inhibiting the rearward propagating light beam from entering the input optical fiber.

An improvement to the Uchida et al. isolator is described in U.S. Pat. No. 4,239,329 to Matsumoto. The optical isolator of Matsumoto also includes a Faraday rotator and a half-wave plate that are arranged between two birefringent crystals. However, the optical isolator of Matsumoto further includes a lens for focusing light beams that are diverging upon exit from an input optical fiber. The lens is placed in front of the isolator assembly. The lens focuses the diverging light beams to an output optical fiber by converging the light beams. In another embodiment, a second lens is placed at the rear of the isolator assembly.

There are a number of factors that must be considered in the design of optical circulators and isolators. U.S. Pat. No. 5,319,483 to Krasinski et al. identifies insertion loss and crosstalk as two performance-related design considerations. Insertion loss is the difference in power between input light and the light that exits the optical assembly. The primary causes of insertion loss are identified as absorption of light and imperfections of polarization separation and recombination. Crosstalk in an optical circulator is the transmission of light from an input fiber to a fiber which is not the intended output fiber. Krasinski et al. assert that the primary cause of crosstalk in optical circulators is back-reflection from the various optical elements in the assembly. The system described in the patent utilizes birefringent crystals instead of polarization splitting cubes in an attempt to provide more complete polarization separation, thereby reducing insertion loss and crosstalk. Moreover, the system is one in which the optical elements of the assembly are in optical contact with each other, thereby reducing back-reflections. Similar techniques are utilized in the optical circulator described in U.S. Pat. No. 5,204,771 to Koga.

Another approach to reducing insertion loss and crosstalk is described in U.S. Pat. No. 5,574,596 to Cheng. The optical circulator includes two birefringent crystal end-plates, two nonreciprocal Faraday rotators inserted between the birefringent crystal end-plates, and a pair of matched birefringent crystal plates positioned between the two rotators. The first birefringent crystal end-plate divides an input beam traveling in a first direction into two polarization components. The adjacent nonreciprocal Faraday rotator properly aligns the polarization components for lateral displacement (walk-off) by the center birefringent crystal plates. The polarization components are again rotated at the second Faraday rotator. The second end-plate then recombines the two polarization components for output. Since the structure is operationally symmetrical from a center plane perpendicular to the direction of light propagation, the operations will be the same regardless of the direction of light input into the assembly. However, some of the operations are nonreciprocal, so that the opposed paths will not be coincident. In an attempt to reduce the number of required components for achieving optical isolation or circulation, Cheng et al. (in U.S. Pat. No. 5,471,340) utilize a mirror at an optical assembly having adjacent input/output ports at the end of the assembly opposite to the mirror. Thus, a birefringent crystal end-plate can perform both the polarization separation and the polarization recombination operations for a single input beam.

In addition to the above-identified performance-related concerns, there are manufacturing-related concerns. Preferably, the assembly is physically small, providing advantages with respect to the cost of materials and the ability to house a number of such assemblies. Rutile is a common material for forming the birefringent crystals that provide the desired walk-off displacements within the assembly. For each 1 mm of walk-off, the rutile crystal must have a thickness of approximately 10 mm. The thicknesses of the other optical elements in the assembly, e.g. the Faraday rotator, add to the total thickness dimension of the assembly.

While known optical isolators operate well for their intended purposes, improvements in performance and reduction in fabrication cost are desired in a design of optical isolators. What is needed is an optical isolator for coupling multiple optical fibers for transmitting signals, such as light signals within a communication network, with a high density of input/output ports and with a significant cost efficiency in the fabrication process.

SUMMARY OF THE INVENTION

An optical nonreciprocal apparatus, preferably an optical isolator, and a method of isolating the propagations of light signals from multiple input optical fibers to multiple output optical fibers utilize compact isolator chips formed by a nonreciprocal rotator assembly that is positioned between two walk-off crystals. Preferably, the nonreciprocal rotator assembly includes a Faraday rotator and a half-wave plate. The nonreciprocal rotator assembly provides 90° rotation of polarization components of forward propagating light beams while providing approximately 0° rotation for rearward propagating light beams. The nonreciprocal rotator assemblies can provide rotation in either the clockwise or the counter-clockwise direction. The only light energy that is propagated to an input in the rearward direction is the portion of polarization components of rearward propagating light beams that are the result of the imperfect rotation caused by the nonreciprocal rotator assembly.

In one embodiment, the optical nonreciprocal apparatus includes two isolator chips and an array of lenses to provide a two-stage optical isolator. Preferably, the walk-off crystals in the second isolator chip provide displacement of aligned polarization components of forward propagating light beams in a direction that is perpendicular to the walk-off direction of the walk-off crystals in the first isolator chip. For example, the walk-off crystals in the first isolator chip may each have a walk-off direction in the positive y-direction with respect to forward propagating light beams. On the other hand, the walk-off crystals in the second isolator chip may each provide displacement in the negative x-direction. The thickness of the walk-off crystals in both the first chip and second isolator chip depends on whether the optical fibers involved are single-mode fibers or thermally expanded core (TEC) fibers. TEC fibers require thicker walk-off crystals than single-mode fibers.

The array of lenses is positioned between the first isolator chip and the second isolator chip. The array of lenses may be comprised of conventional lenses. Each lens focuses a light beam from an input optical fiber, that has been diverging since emanating from the fiber, to a corresponding output optical fiber. Alternatively, the array of lenses may be an array of micro-lenses. For example, microscopic lenses may be formed into a glass substrate by diffusing ions through a photolithograhic mask. The integration of ion-exchange technology and photolithography to create a lens array is known in the art.

In another embodiment, the array of lenses is substituted for two large converging lenses. Preferably, the two lenses are positioned between the first isolator chip and the second isolator chip such that the distance between two lenses is twice the focal length of the lenses. In addition, the distance from the lenses to the adjacent faces of isolator chips is equal one focal length of the lenses. In this embodiment, light beams from the input ports travel through the first isolator chip in a parallel manner. The light beams then impinge upon the first lens, which converges the light beams to a focal point. After the focal point, the light beams diverge and impinge upon the second lens. In other words, the first lens inversely projects the light beams onto the second lens. The second lens then redirects the light beams back to parallel formation to the second isolator chip. After traveling through the second isolator chip, the light beams are transmitted to the output optical fibers.

In either of the above embodiments, additional isolator chips may be coupled to the first and second isolator chips. For example, the first isolator chip may be affixed to a third isolator chip and the second isolator chip may be affixed to a fourth isolator chip, such that a forward propagating light beam will encounter two isolator chips, before and after the lenses. The walk-off crystals in the third and fourth isolator chips may have walk-off directions that coincide with the walk-off directions of the first and second isolator chips, respectively.

The nonreciprocal apparatus may also include a pair of fiber holders. The fiber holders may be utilized to compensate for refraction when light enters and exits optical fibers. In a first refraction-compensating embodiment, the input optical fibers are mounted on a first fiber holder at an angle θ with respect to the direction of the light beam when exiting the fiber (z-axis). The output optical fibers are also mounted on a second fiber holder at an angle −θ with respect to the z-axis. The angle ±θ compensates for refraction of the light beams caused by encountering a change in indices of refraction when exiting or entering an optical fiber. The magnitude of the angle ±θ that is needed to compensate for refraction and to improve alignment of the light beams from the input optical fibers to the output optical fibers depends on the type of fibers utilized. For single-mode fibers, θ is approximately 8°. However, θ can be 2° to 3° for TEC fibers.

In a second refraction-compensating embodiment, the fiber holders are physically attached to the first and second isolator assemblies. The first fiber holder and the first isolator assembly are positioned such that light beams travel through the first isolator assembly at an angle θ with respect to the direction of the light beam when exiting the first isolator assembly (z-axis). Conversely, the second fiber holder and the second isolator assembly are positioned such that a light beam traveling in the z-axis direction will be directed toward the output optical fiber after refraction. In this embodiment, the refractions occur when light beams are exiting and entering the first and second isolator assemblies, respectively.

A method of isolating propagation of light from multiple input optical fibers to multiple output optical fibers in accordance with the invention utilizes an optical nonreciprocal apparatus having first and second isolator assemblies. The first and second isolator assemblies consist of isolator chips. Preferably, each isolator chip includes a Faraday rotator and a half-wave plate that are positioned between two walk-off crystals. Initially, the first isolator assembly receives substantially parallel light beams from the input optical fibers. Next, the first isolator assembly manipulates polarization components of the light beams propagating through the first isolator assembly. The manipulation involves separating the polarization components of a light beam, rotating the polarization components, and recombining the separated polarization components for forward propagating light beams. However, the first isolator assembly operates to achieve 0° rotation of the polarization components of light beams propagating in the rearward direction such that the rearward propagating light beams do not couple back to the input optical fibers. If the first isolator assembly contains two isolator chips, the manipulation of polarization components is repeated.

The light beams are then directed and focused to locations on the second isolator assembly in order for the light beams to reach predetermined output optical fibers. The directing and focusing may involve inversely projecting the light beams by a first lens to a second lens. Next, the step of manipulating polarizations is repeated by the second isolator assembly. Preferably, the second isolator assembly separates the polarization components by displacing one of the polarization components in a walk-off direction that is perpendicular to the walk-off direction of the first isolator assembly. Again, the step of manipulating polarization components is performed twice, if the second isolator assembly contains two isolator chips. Next, the light beams are transmitted to corresponding output optical fibers.

An advantage of the invention is that the basic components, i.e., the isolator chips, are physically compact. In addition, the same isolator chip can be utilized to create the first and second isolator assemblies of the invention, reducing the cost of fabrication. Still another advantage of the invention is that additional isolator chips can be utilized to increase the performance of the optical nonreciprocal apparatus.

BRIEF DESCRIPTION OF THE DRAWINGS

FIG. 3 is an end view of a silicon substrate having a V-shaped groove for precise positioning of an optical fiber.

FIG. 4 is a partial perspective view of the silicon wafer of FIG. 3 having a second silicon substrate to sandwich the optical fiber into position.

FIGS. 6–15 illustrate the operations performed upon polarization components of a forward propagating light beam through the optical isolators of FIGS. 1, 2 and 5.

FIGS. 16–25 illustrate the operations performed upon polarization components of a rearward propagating light beam through the optical isolators of FIGS. 1, 2 and 5.

FIGS. 29–38 illustrate the operations performed upon polarization components of forward propagating light beams through the multi-port optical isolator of FIG. 28.

FIGS. 39–48 illustrate the operations performed upon polarization components of rearward propagating light beams through the multi-port optical isolator of FIG. 28.

DETAILED DESCRIPTION

Figure 1:
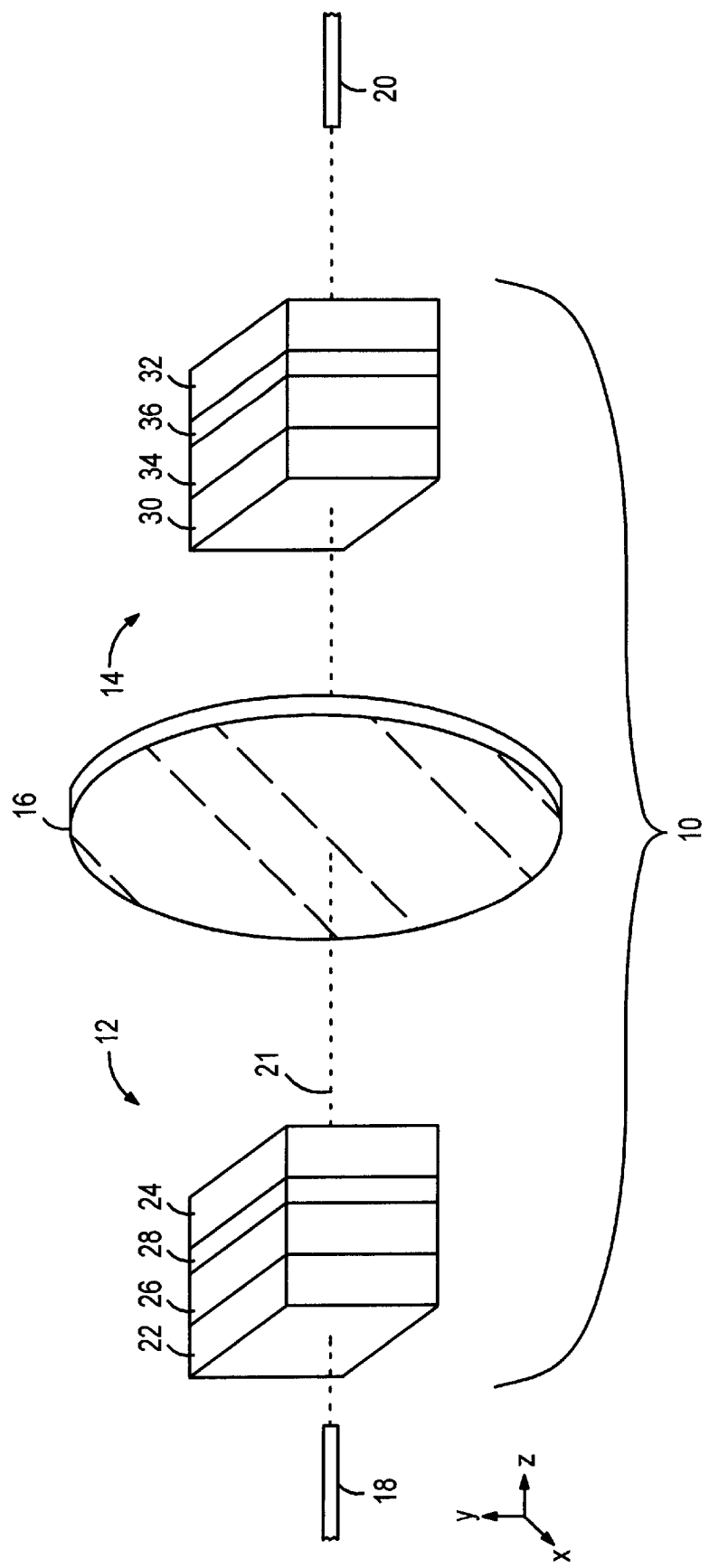
FIG. 1 is a perspective view of an optical isolator in accordance with the invention.

In FIG. 1, an optical isolator 10 having a first isolator assembly 12, a second isolator assembly 14, and a lens 16 is shown connected between an input optical fiber 18 and an output optical fiber 20. The optical isolator 10 provides a low insertion loss coupling of the two optical fibers 18 and 20 through a propagation path 21. The optical fibers 18 and 20 may be single-mode fibers or thermally expanded core (TEC) fibers. An advantage of TEC fibers over single-mode fibers is the ease of fiber-to-fiber coupling. However, the use of TEC fibers requires thicker isolator assemblies 12 and 14, as described below.

The first isolator assembly 12 includes a pair of walk-off crystals 22 and 24, also known as "birefringent crystals," that sandwich a Faraday rotator 26 and a half-wave plate 28. The walk-off crystals 22 and 24 provide a displacement in the positive y-direction of vertical polarization components of light beams that are propagating in the forward direction, i.e. positive z-direction. However, the walk-off crystals 22 and 24 displace in the negative y-direction vertical polarization components of light beams that are propagating in the rearward direction, i.e. negative z-direction. The walk-off crystals 22 and 24 may be made of rutile (titanium dioxide-$TiO_2$) or yttrium vanadate ($YVO_4$). In addition, inexpensive Lithium Niobate ($LiNbO_4$) may be used to form the walk-off crystals 22 and 24. The thickness of the walk-off crystals 22 and 24 depends on the type of the optical fibers 18 and 20, due to the difference in mode field diameters (MFDs). Wider MFDs require greater spatial displacement by the walk-off crystals 22 and 24. For example, if TEC fibers having an MFD of 35 $\mu$m are used, the thickness of the walk-off crystals 22 and 24 needs to be 1 mm in order to provide 100 $\mu$m spatial displacement. For single-mode fibers having an MFD of 10 $\mu$m, the thickness of the walk-off crystals 22 and 24 would only have to be 0.25 $\mu$mm to 0.35 mm in order to provide 25 $\mu$m to 35 $\mu$m spatial displacement. Thus, the use of TEC fibers will result in a thicker dimension of the isolator assembly 12.

The Faraday rotator 26 and the half-wave plate 28 provide a clockwise rotation of polarization components of forward propagating light beams. The combination of the Faraday rotator 26 and the half-wave plate 28 rotates the polarization components of the forward propagating light beams by 90°. The Faraday rotator 26 rotates the polarization components by 45°. The half-wave plate rotates the polarization components by an additional 45°. In the rearward direction, the Faraday rotator 26 and the half-wave plate 28 provide approximately 0° rotation of the polarization components. The half-wave plate rotates the polarization components of rearward propagating light beams in the counter-clockwise direction by 45°. However, the Faraday rotator 26 rotates the polarization components of the rearward propagating light beams in the clockwise direction by 45°, which negates the rotation of the half-wave plate 28.

The second optical assembly 14 also includes a pair of walk-off crystals 30 and 32 that sandwich a Faraday rotator 34 and a half-wave plate 36. Preferably, the second optical assembly 14 is identical to the first isolator assembly 12, except for the orientation of the assembly 14 about the propagation path 21. The orientation of the second isolator assembly 14 is such that the walk-off crystals 30 and 32 provide lateral displacement of horizontal polarization components of propagating light beams. In the forward direction, the walk-off crystals 30 and 32 displace the horizontal polarization components in the negative x-direction. In the rearward direction, the walk-off crystals 30 and 32 displace the horizontal polarization components in the positive x-direction. In other words, the second isolator assembly 14 is identical to a first isolator assembly 12 that has been rotated by 90° in the counter-clockwise direction.

A concern with the use of the optical isolator 10 is the effect of refraction due to light beams traveling from one medium having an index of refraction to another medium having a different index of refraction. As light beams travel from the input fiber 18 to air, that is present between the first isolator assembly 12 and the input optical fiber 18, the index of refraction changes from approximately 1.5 to 1. In addition, as light beams travel from air, that is present between the second isolator assembly 14 and the output optical fiber 20, the index of refraction changes from approximately 1 to 1.5. In order to compensate for changes in indices of refraction, the light beams can be forced to make an angle ±θ with respect the z-axis at either end of the input and output optical fibers 18 and 20, or ends of the isolator assemblies 12 and 14 that are next to the lens 16, if the optical fibers 18 and 20 are physically attached to the isolator assemblies 12 and 14.

Figure 2:
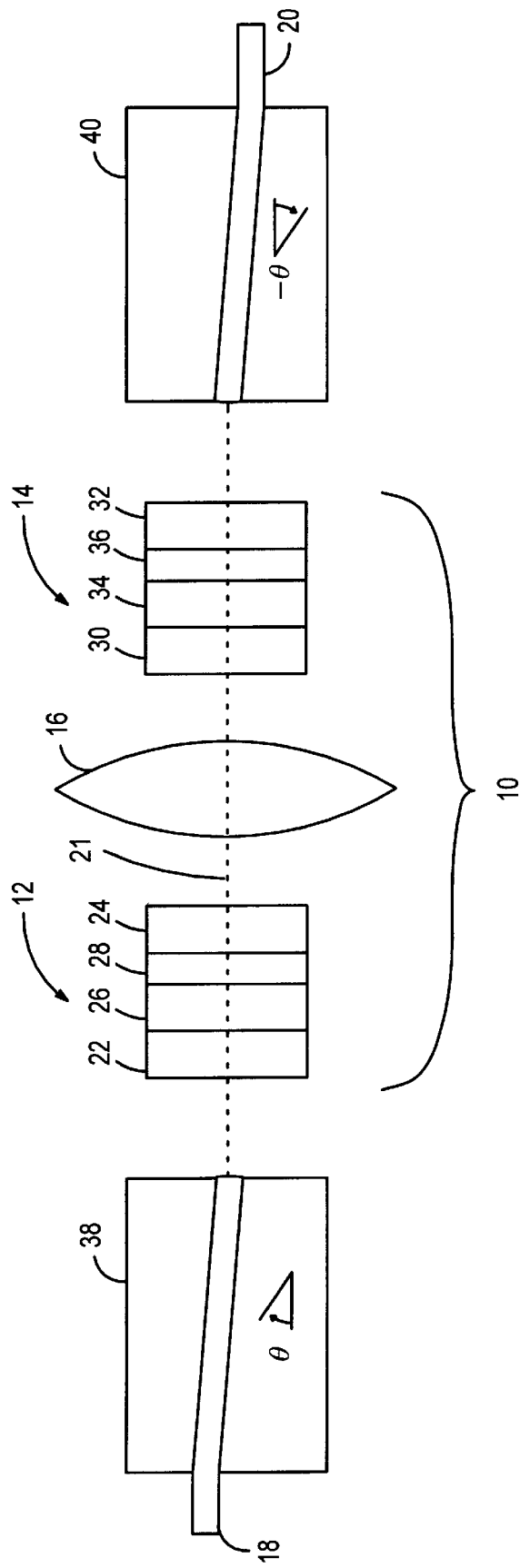
FIG. 2 is a top view of an optical isolator in accordance with a first refraction-compensating embodiment.

FIG. 2 illustrates the first refraction-compensating embodiment of the invention. The input optical fiber 18 is mounted on a fiber holder 38 at an angle θ with respect to the z-axis, which is the general direction of propagating light beams through the lens 16. The output optical fiber 20 is also mounted on a fiber holder 40 at an angle −θ with respect to the z-axis. The magnitude of angles θ and −θ that is needed to compensate for refraction and to improve alignment of the light beams from the input optical fiber 18 to the output optical fiber 20 depends on the type of fibers utilized for the optical fibers 18 and 20. For single-mode fibers, the angle θ is approximately 8°. However, the angle θ can be 2° to 3° for TEC fibers.

In operation, a light beam travels generally through the portion of the input optical fiber 18 within the fiber holder 38 in the −θ direction. The light beam encounters a change in the index of refraction at the end of the optical fiber 18. The change in index causes the light beam to refract to the z-axis. The light beam travels generally through the first isolator assembly 12, the lens 16, and the second isolator assembly 14 in the positive z-direction. Preferably, the lens 16 and the isolator assemblies 12 and 14 are specifically designed to eliminate refraction. The light beam is refracted again when entering the output optical fiber 20. The second refraction is again compensated by the angle of the output optical fiber 20 with respect to the z-axis.

The fiber holders 38 and 40 can be composed of semiconductor substrates. Preferably, the fiber holders 38 and 40 are etched to form a V-shaped groove to properly position the input and output optical fibers 18 and 20. FIG. 3 illustrates an optical fiber 42 positioned on a V-shaped groove 46 that is etched on a substrate, such as a silicon wafer 44. Conventional integrated circuit fabrication techniques may be utilized to form the groove 46. For example, the grooves may be formed photolithographically, using a mask to define the grooves and using chemical etchant. While not critical, the angle of one of the V-shaped groove 46 relative to the other wall is preferably 70.5°. The fiber holders 38 and 40 may also include another etched silicon wafer 48 that is affixed to the lower silicon wafer 44 by a layer of adhesive 50, as shown in FIG. 4. The use of an adhesive layer is not critical to the invention. Alternatively, wafer bonding may be used to attach the two silicon wafers 44 and 48.

Figure 5:
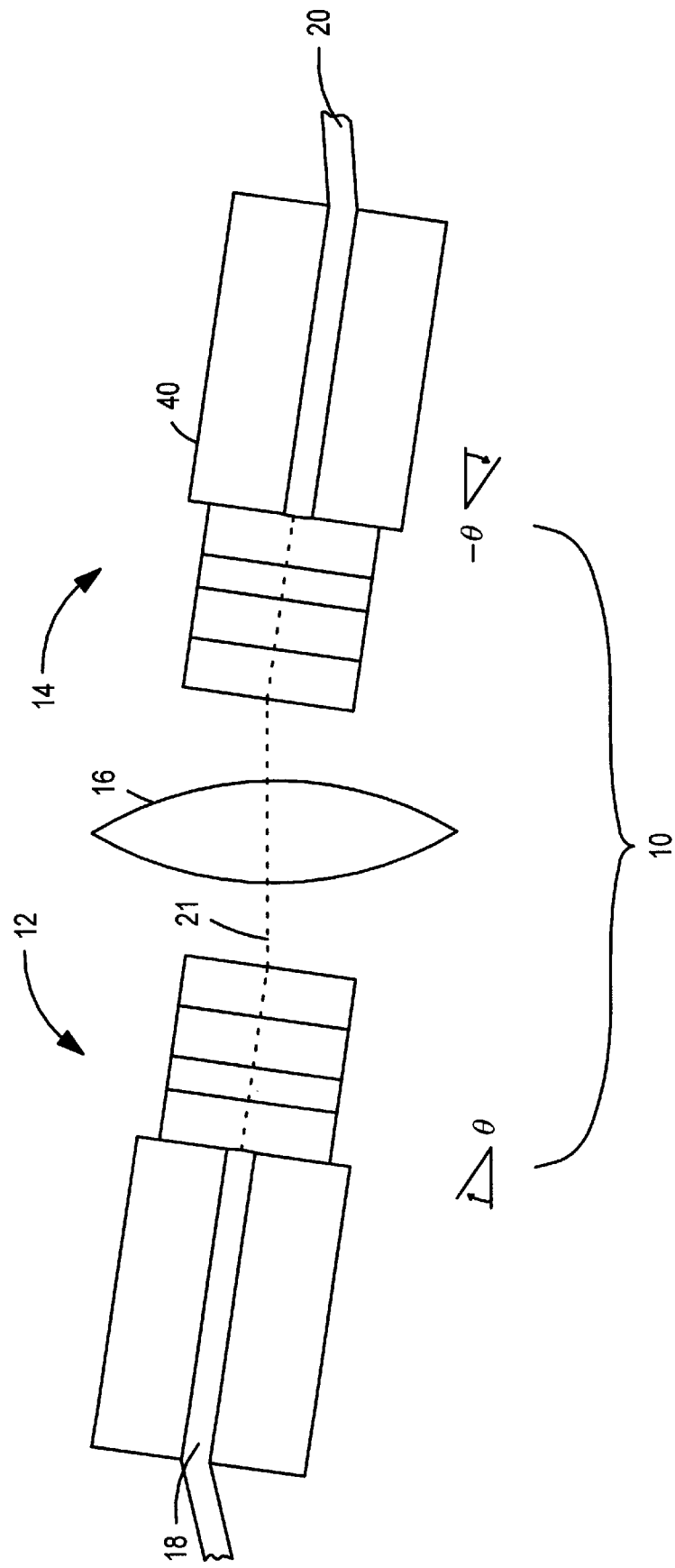
FIG. 5 is a top view of an optical isolator in accordance with a second refraction-compensating embodiment.

In FIG. 5, a second refraction-compensating embodiment of the invention is illustrated. In this embodiment, the isolator assembly 12 is positioned at an angle θ, while the isolator assembly 14 is positioned at an angle −θ. The optical fibers 18 and 20 and the fiber holders 38 and 40 are physically attached to the isolator assemblies 12 and 14, respectively. The optical fibers 18 and 20 are positioned in order to provide a propagation path of light beams at angle ±θ with respect to the z-axis. The operation of the second refraction-compensating embodiment shown in FIG. 5 is similar to the operation of the first refraction-compensating embodiment. The only substantive difference is that the refraction compensation occurs at the surfaces of the isolator assemblies 12 and 14 that are facing the lens 16.

FIGS. 6–15 illustrate the operation of the optical isolator 10 on polarization components of a light beam from the input optical fiber 18 to the output optical fiber 20 that are propagating in the forward direction, i.e., positive z-direction. Each of the ten figures is an illustration of the relative positions of the polarization components of a light beam at a forward face of one of the optical elements in the isolator assemblies 12 and 14, as viewed from the position of the input optical fiber 18.

FIG. 6 shows two orthogonal polarization components 80 and 82 of a light beam from the input optical fiber 18 that is about to enter an input port, i.e., window, at the forward face of the walk-off crystal 22 of the isolator assembly 12. The input port is positioned at location 84, which is defined by the axis of the input optical fiber. Other relevant locations are referenced 86, 88 and 90. As will become apparent, location 88 is the position of ports that are next to the lens 16 in both isolator assemblies 12 and 14. Location 90 is the position for an output port of the isolator assembly 14 that is aligned to the output optical fiber 20.

The polarization components 80 and 82 enter the first isolator assembly 12, encountering the walk-off crystal 22. As the light beam travels through the walk-off crystal 22, the vertical polarization component 82 is displaced in a walk-off direction that is in the positive y-direction, as indicated by the arrow in the lower left corner of FIG. 6. As stated above, the amount of displacement depends on the thickness of the walk-off crystal 22.

After traveling through the walk-off crystal 22, the polarization component 82 has been displaced from location 84 to location 88, as shown in FIG. 7. Next, the polarization components 80 and 82 travel through the Faraday rotator 26, which rotates the polarization components 80 and 82 in the clockwise direction by 45°, as shown in FIG. 8. In FIG. 9, the polarization components 80 and 82 have further rotated by 45° in the clockwise direction by the half-wave plate 28. The overall effect of the Faraday rotator 26, in conjunction with the half-wave plate 28, is a 90° rotation of the polarization components 80 and 82 in the clockwise direction.

The polarization components 80 and 82 are recombined by the walk-off crystal 24. As shown in FIG. 10, the walk-off crystal 24 has displaced the now-vertical polarization component 80 to location 88 and has combined the polarization components 80 and 82. The recombined polarization components 80 and 82 exit the first isolator assembly 12 through a port at the location 88 on the walk-off crystal 24 and travel toward the lens 16. Preferably, location 88 corresponds to the axis of the lens 16. The lens 16 focuses the light beam that has been diverging as it travels through the first isolator assembly 12.

FIG. 11 illustrates the polarization components 80 and 82 that are focused and positioned to enter the second isolator assembly 14 through a port at location 88. The polarization components 80 and 82 then travel through the walk-off crystal 30. As shown in FIG. 12, the horizontal polarization component 82 has been laterally displaced to location 90 by the walk-off crystal 30. Next, the polarization components 80 and 82 travel through the Faraday rotator 34 and the half-wave plate 36. The operations of the Faraday rotator 34 and the half-wave plate 36 are identical to the operations of the Faraday rotator 26 and the half-wave plate 28. Together, the Faraday rotator 34 and the half-wave plate 36 rotate the polarization components 80 and 82 by 90° in the clockwise direction, as shown in FIGS. 13 and 14. In FIG. 15, the polarization components 80 and 82 have been recombined by the walk-off crystal 32. The polarization components 80 and 82 then enter the output optical fiber 20, positioned at location 90 on the fiber holder 40.

The rearward propagation of a light beam from the output optical fiber 20 to the input optical fiber 18 is illustrated in FIGS. 16–25. Again, each of the ten figures is an illustration of the relative positions of polarization components of rearward propagating light beam before and after traveling through one of the optical elements in the isolator assemblies 12 and 14, as viewed from the position of the input optical fiber 18. The same reference numerals will be used for illustrating the various locations of polarization components of the rearward propagating light beam along the optical isolator 10.

In FIG. 16, a rearward propagating light beam having polarization components 92 and 94 emanates from the output optical fiber 20 that is aligned with location 90. The polarization components 92 and 94 travel through the walk-off crystal 32. Walk-off crystal 32 displaces the polarization components 94 in the positive x-direction to location 88, as shown in FIG. 17. After the walk-off crystal 32, the polarization components 92 and 94 encounter the half-wave plate 36. The polarization components 92 and 94 are rotated by 45° in the counter-clockwise direction by the half-wave plate 36, as shown in FIG. 18. However, the polarization components 92 and 94 are re-rotated by 45° in the clockwise direction by the Faraday rotator 34.

Ideally, the Faraday rotator 34 and the half-wave plate 36 will have rotated the polarization components 92 and 94 such that the overall effect on the polarization components 92 and 94 is a 0° rotation. However, the rotation caused by the Faraday rotator 34 and the half-wave plate can vary depending upon temperature and wavelength of the light beam. Therefore, due to variations in temperature and/or wavelength, the rotations caused by the Faraday rotator 34 and the half-wave plate will not be exactly 0°. The imperfect rotation will introduce an error angle $\phi_1$. The error angle $\phi_1$ causes error polarization components 96 and 98 to be present, as shown in FIG. 19. The error polarization components 96 and 98 represent the $\sin^2\phi_1$ portion of the original light beam from the output optical fiber 20.

Turning to FIG. 20, the polarization component 98 has been laterally displaced to location 88 by the walk-off crystal 30. In addition, the polarization component 94 has been laterally displaced to a location right of location 88. Because the polarization component 94 will be misaligned with respect to the input optical fiber 18, the polarization component 94 will not be transmitted to the input optical fiber 18. Thus, the polarization component 94 is not illustrated. Similarly, the polarization component 92 will not be transmitted to the input optical fiber 18. Therefore, the polarization component 92 will not be illustrated in the following figures.

Next, the polarization components 96 and 98 travel through the lens 16 toward the first isolator assembly 12. FIG. 21 illustrates the polarization components 96 and 98, prior to entering the walk-off crystal 24. As shown in FIG. 22, the polarization component 96 has been displaced in the negative y-direction to location 84. The polarization components 96 and 98 then travel through the half-wave plate 28 and the Faraday rotator 26. The half-wave plate 28 and the Faraday rotator 26 operate on the polarization components 96 and 98 in the same manner as the half-wave plate 36 and the Faraday rotator 34. As described above, additional error polarization components will be present after traveling through the half-wave plate 28 and the Faraday rotator 26 in the rearward direction. The effects of the half-wave plate 28 and the Faraday rotator 26 are illustrated in FIGS. 23 and 24.

Shown in FIG. 24 are error polarization components 100 and 102 that are due to error angle $\phi_2$ caused by the imperfect rotations caused by the Faraday rotator 26 and the half-wave plate 28. The polarization components 96, 98, 100 and 102 travel through the walk-off crystal 22. The polarization component 100 has been displaced in the negative y-direction to location 84, combining with the polarization component 102, as shown in FIG. 25. The polarization component 96 (not shown) has been displaced to a location below location 84. As stated above, the input optical fiber 18 is aligned with location 84. Therefore, the polarization component 98 will not be transmitted to the input optical fiber 18. Only the polarization components 100 and 102 will reach the input optical fiber 18. The polarization components 100 and 102 represent the $\sin^2\phi_2$ portion of the error polarization components 96 and 98.

Alternate configurations of the optical elements in the isolator assemblies 112 and 114 are possible. For example, the walk-off directions of the walk-off crystals 138 and 140 may be in the negative y-direction, while the walk-off directions of the walk-off crystals 146 and 148 may be in the negative x-direction. In fact, the walk-off directions of the walk-off crystals 138 and 140 may be configured in any possible direction. In addition, the walk-off directions of the walk-off crystals 138, 140, 146 and 148 may be in the same direction. However, a walk-off direction of the walk-off crystals 146 and 148 that is perpendicular to the walk-off direction of the walk-off crystals 138 and 140 is preferred to ensure isolation of rearward propagating light beams. Also, the Faraday rotators 142 and 150 may be positioned behind the half-wave plates 144 and 152. The rotations performed by the Faraday rotators 142 and 150 and the half-wave plates 144 and 152 may be either in the clockwise direction or the counter-clockwise direction. Lastly, the first isolator assembly 112 may be coupled to a third isolator assembly, while the second isolator assembly 114 may be couple to a fourth isolator assembly. Preferably, the third and fourth isolator assemblies are structurally identical to the first and second isolator assemblies 112 and 114. Various walk-off directions are possible for the walk-off crystals of the third and fourth isolator assemblies, as long as fiber-to-fiber coupling is achieved.

Figure 26A:
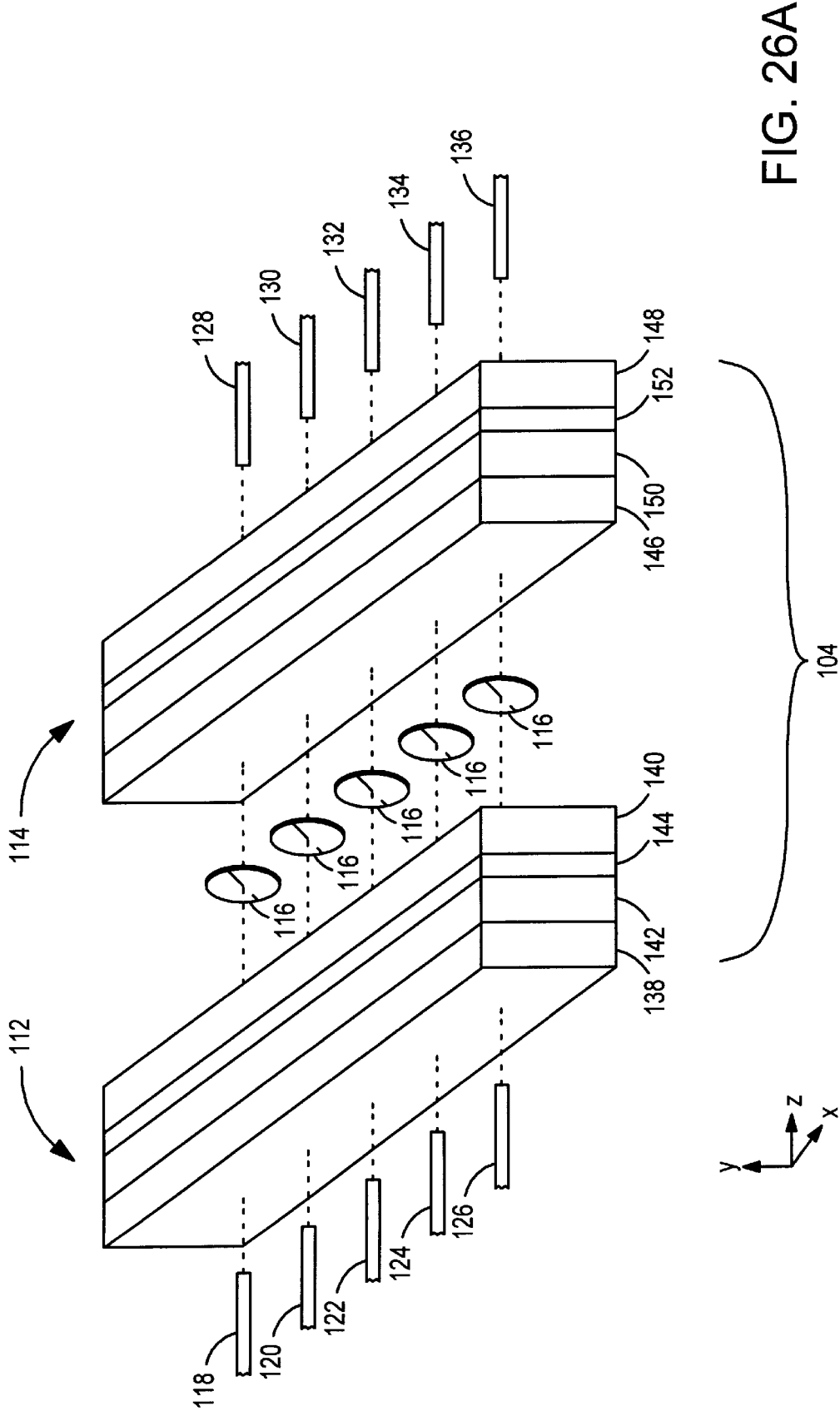
FIG. 26A is a perspective view of a multi-port optical isolator in accordance with a first embodiment of the invention.

FIG. 26A is a perspective view of a multi-port optical isolator 104 in accordance with the first embodiment of the invention. The multi-port optical isolator 104 includes a first isolator assembly 112, a second isolator assembly 114, and five lenses 116. The multi-port optical isolator 104 is positioned between five input optical fibers 118, 120, 122, 124 and 126 and five output optical fibers 128, 130, 132, 134 and 136. The optical fibers 118, 120, 122, 124, 126, 128, 130, 132, 134 and 136 can be single-mode fibers or TEC fibers. The optical isolator 104 provides coupling of optical fibers 118, 120, 122, 124, and 126 to optical fibers 128, 130, 132, 134, 136, and 138, respectively. Although the multi-port optical isolator 104 is shown coupling only five input optical fibers to three output optical fibers, the multi-port optical isolator 104 may be utilized to couple numerous input optical fibers to a corresponding number of output optical fibers.

The optical fibers 118, 120, 122, 124, 126, 128, 130, 132, 134 and 136 can be placed in fiber holders (not shown) in the same manner as the optical fibers 18 and 20 in the fiber holders 38 and 40, shown in FIG. 2. Similar to the configuration shown in FIG. 2, the input optical fibers 118-126 can be placed in a fiber holder such that the optical fibers 118–126 make an angle θ with respect to the z-axis. The fibers 128–136 can also be positioned at an angle –θ on a second fiber holder in order to compensate for any refraction. Alternatively, the fibers 118, 120, 122, 124, and 126, along with the fiber holder and the first isolator assembly 112, can be positioned such that the light beams, prior to exiting the first isolator, are traveling in a $-\theta$ direction, similar to the configuration shown in FIG. 3. The output fibers 128, 130, 132, 134, and 136 can also be positioned in a fiber holder, as described above, to compensate for any refraction.

Figure 26B:
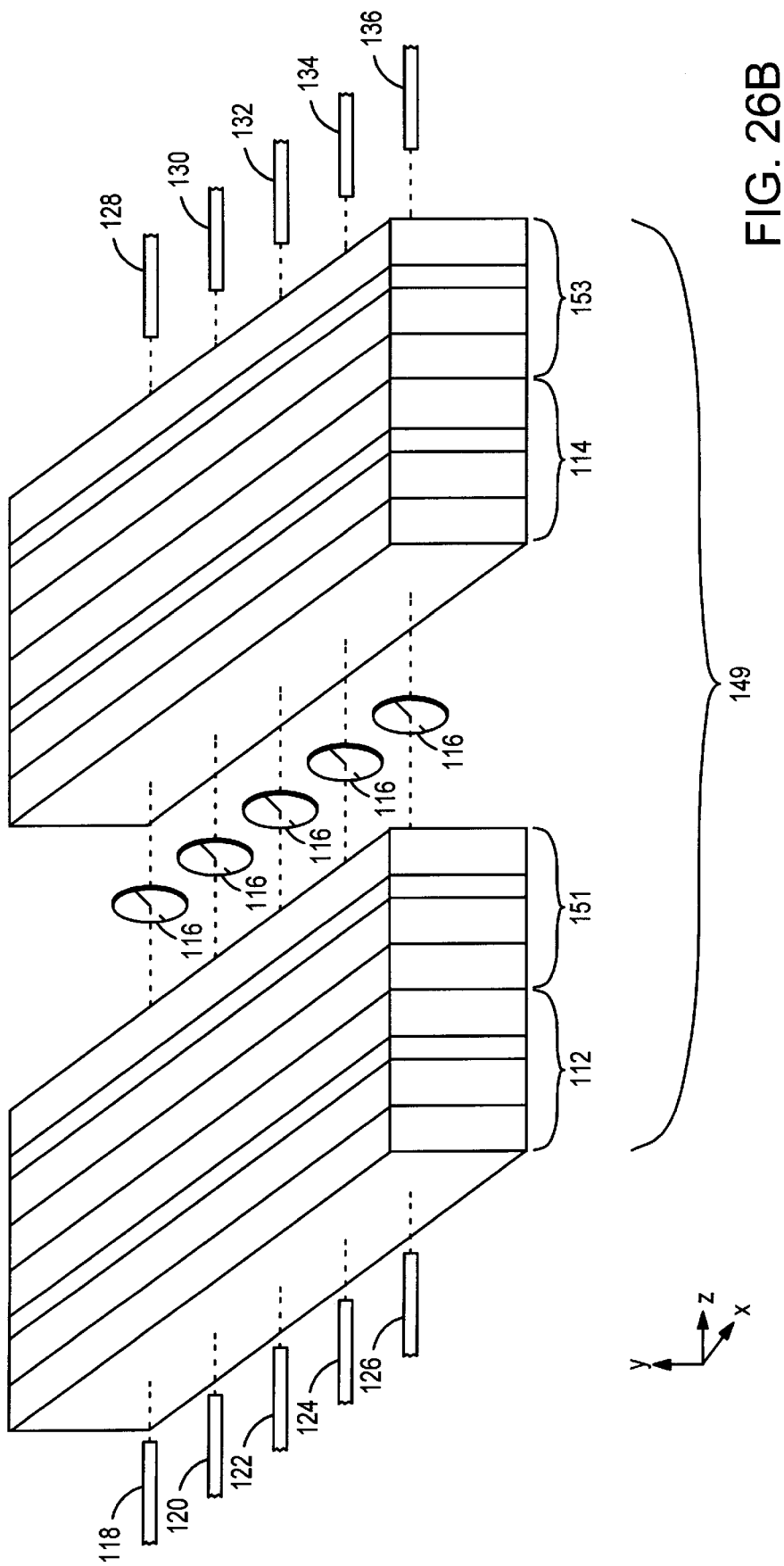
FIG. 26B is a perspective view of a multi-port optical isolator in accordance with a modification to the first embodiment of FIG. 26A.

The isolator assemblies 112 and 114 are structurally identical to the isolator assemblies 12 and 14 of the optical isolator 10. The isolator assembly 112 includes two walk-off crystals 138 and 140, a Faraday rotator 142, and a half-wave plate 144. The walk-off crystals 138 and 140 may provide displacement of polarization components of forward propagating light beams, identical to the walk-off crystals 22 and 24 of the optical isolator 10. Similarly, the Faraday rotator 142 and the half-wave plate 144 may provide 90° rotation in the clockwise direction for forward propagating light beams. Similarly, the second isolator assembly 114 includes two walk-off crystals 146 and 148, a Faraday rotator 150, and a half-wave plate 152. The operations of the isolator assemblies 112 and 114 can be identical to the isolator assemblies 12 and 14. Alternative configurations of the optical elements in the isolator assemblies 12 and 14, as described above, are also applicable to the isolator assemblies 112 and 114. For example, FIG. 26B illustrates a multi-port optical isolator 149 that includes the first and second isolator assemblies 112 and 114, but also includes third and fourth isolator assemblies 151 and 153. Optionally, the third assembly 151 is structurally identical to the first assembly 112, while the fourth assembly 153 is structurally identical to the second assembly 114. This requires a larger minimum size than the configuration in which only two isolator assemblies are used, since the total walk-off distance in each direction will be doubled.

Figure 27:
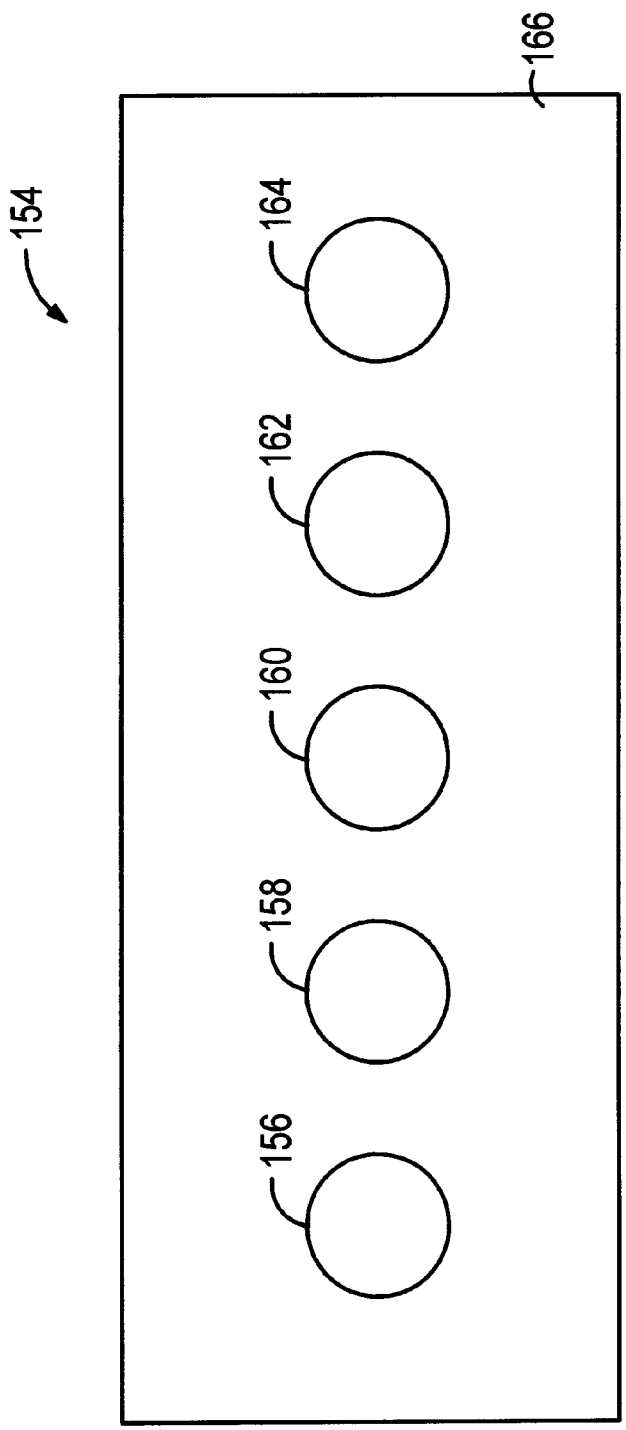
FIG. 27 is a forward view of a focusing element that can be used in the multi-port optical isolator of FIG. 26A.

The lenses 116 of FIGS. 26A and 26B can be conventional lenses or micro-lenses. Preferably, the lenses 116 are designed to optimally focus light beams from the isolator assembly 112 such that the light beams are efficiently transmitted to correspond output optical fibers 128, 130, 132, 134 and 136. If micro-lenses are utilized, the lenses 116 may be configured in the manner illustrated in FIG. 27. The number of micro-lenses would depend on the number of optical fibers that need to be coupled by the multi-port optical isolator 104. A micro-lens array 154 having five micro-lenses 156, 158, 160, 162 and 164 is shown in FIG. 27. The micro-lenses 156, 158, 160, 162, and 164 are formed in a substrate 166. The micro-lenses 156, 158, 160, 162, and 164 may be provided by diffusing ions through a photo-lithographic mask into the substrate 166. Thus, there is an integration of ion-exchange technology and photolithography. Such micro-lens arrays are commercially available from NSG America, Inc. The micro-lenses 156, 158, 160, 162, and 164 are configured to direct light beams from the first isolator assembly 112 to second isolator assembly 114 such that fiber-to-fiber couplings are achieved.

Figure 28:
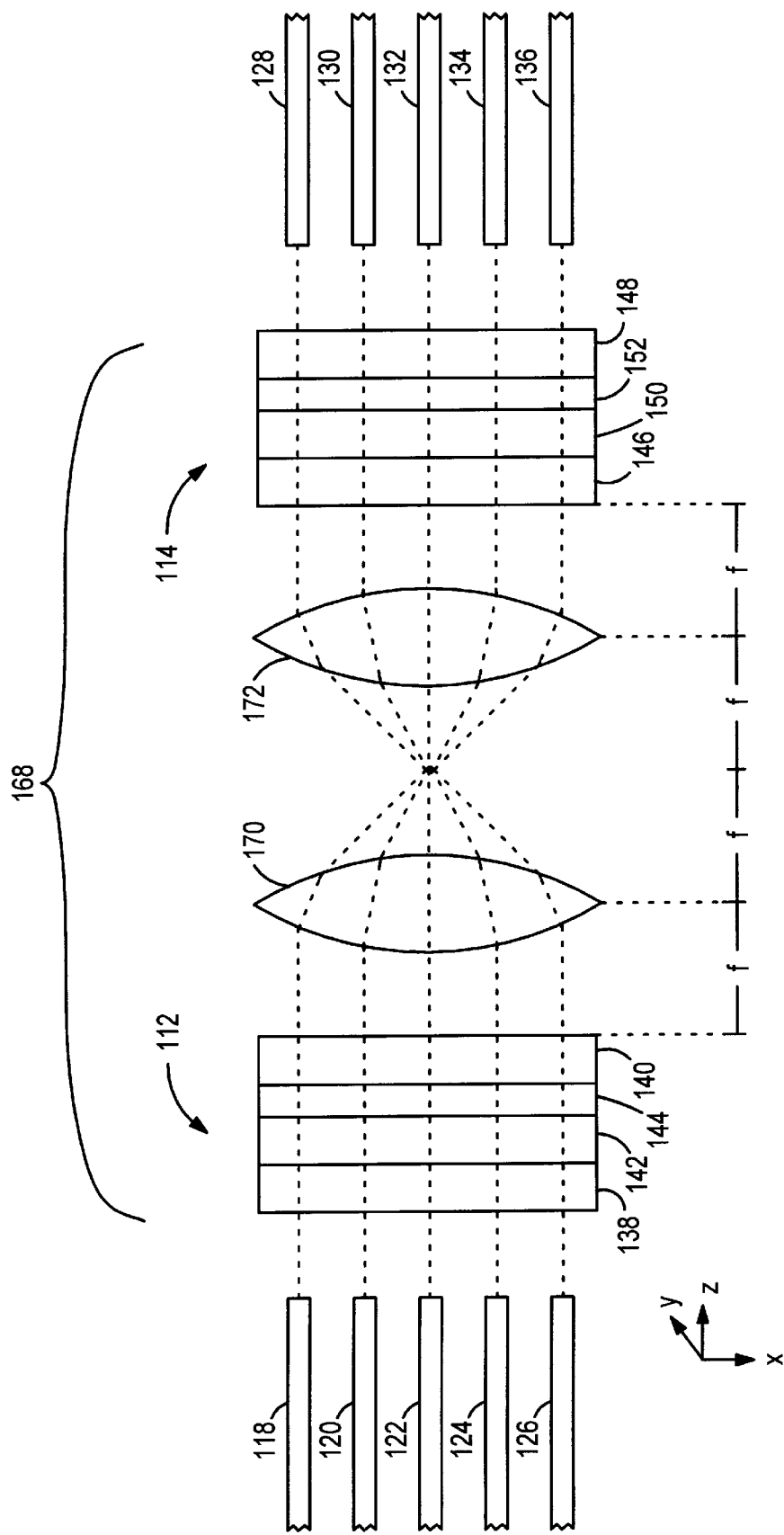
FIG. 28 is a top view of a multi-port optical isolator in accordance with a second embodiment of the invention.

In FIG. 28, a multi-port optical isolator 168 in accordance with the second embodiment of the invention is illustrated. The only structural difference between the multi-port optical isolator 168 and the multi-port optical isolator 104 is the substitution of lenses 116 with two lenses 170 and 172. The lenses 170 and 172 are converging lenses. Preferably, the lenses 170 and 172 are positioned between the first isolator assembly 112 and the second isolator assembly 114 such that the distance between two lenses 170 and 172 is twice the focal length of the lenses 170 and 172. In addition, the distance from the lenses 170 and 172 to the adjacent faces of isolator assemblies 112 and 114, respectively, should equal one focal length of the lenses 170 and 172. Similar to the multi-port optical isolator 104, the multi-port optical isolator 168 may employ refraction-compensating means.

The lenses 170 and 172 operate to couple light beams from the input optical fibers 118, 120, 122, 124 and 126 to the corresponding output optical fibers 128, 130, 132, 134, and 136. By the operation of the lenses 170 and 172, a light beam from the input fibers 118, 120, 122, 124 and 126 is directed to the output fibers 136, 134, 132, 130, and 128, respectively. For example, a light beam from the input optical fiber 118 exiting from the first isolator assembly 112 impinges upon the lens 170 at a point off-axis of the lens 170. The converging lens 170 inversely projects the light beam to the lens 172. The lens 172 receives the light beam and directs it to a preselected location on the isolator assembly 114, allowing the light beam to be transmitted to the output optical fiber 136. However, a light beam from the input fiber 122 may propagate virtually in a straight line through the lenses 170 and 172 to the output fiber 132, if the light beam travels through the axes of lenses 170 and 172.

Although the optical elements in the isolator assemblies 112 and 114 of the multi-port optical isolator 168 can be configured identically to the optical elements in the isolator assemblies 12 and 14, the optical elements in the multi-port optical isolator 168 are slightly modified to illustrate an alternative configuration. The isolator assembly 112 includes two walk-off crystals 138 and 140 that provide displacement of polarization components of forward propagating light beams in a positive 45° direction from the positive y-axis. Preferably, the amount of displacement is a/$\sqrt{2}$, where a is the distance from the center of one input optical fiber to the center of an adjacent input optical fiber. The isolator assembly 112 also includes a Faraday rotator 142 and a half-wave plate 144. The Faraday rotator 142 and the half-wave plate 144 provide 90° rotation in the counter-clockwise direction for forward propagating light beams, instead of the clockwise direction of the Faraday rotator 26 and the half-wave plate 28 of the optical isolator 10 of FIGS. 1, 2 and 5.

Similar to the isolator assembly 14, the second isolator assembly 114 is almost identical to the first isolator assembly 112, except for the orientation of the assembly 114 about the z-axis. The second isolator assembly 114 includes the same optical elements as the first isolator assembly 112. However, all of the optical elements have been rotated by 90° in the counter-clockwise direction. The second isolator assembly 114 includes two walk-off crystal 146 and 148, having walk-off directions in the negative 45° direction from the positive y-axis. The second isolator assembly 114 also includes a Faraday rotator 150 and a half-wave plate 152 that operate in the same manner as the Faraday rotator 142 and a half-wave plate 144.

FIGS. 29–38 illustrates the operation of the multi-port optical isolator 168 on polarization components of a first and second light beams from any two adjacent input fibers propagating in the forward direction. For example, the first light beam may exit out of the input optical fiber 118, while the second light beam may exit out of the adjacent input optical fiber 120. Although a light beam may emanate from each input optical port 118, 120, 122, 124 and 126, only two light beams are illustrated for simplicity.

In FIG. 29, a first pair of orthogonal polarization components 174 and 176, and a second pair of orthogonal polarization components 178 and 180 that are about to enter input ports, i.e., windows, at the forward face of the isolator assembly 112, are shown. The polarization components 174 and 176 represent a light beam from the input optical fiber 118 that is about to enter the input port positioned at location 182. The polarization components 178 and 180 represent a light beam from the input optical fiber 120 that is about to enter the other input port positioned at location 184. Other relevant locations are referenced 186, 188, 190 and 192. The locations 186 and 188 are the positions of ports on the faces of the isolator assemblies 112 and 114 that are next to the lenses 170 and 172. As for location 190 and 192, these are the positions for first and second output ports of the isolator assembly 114 that are aligned to the output optical fibers 134 and 136. As will be described in detail below, the first light beam from the input optical fiber 118 will enter the output optical fiber 136, while the second light beam from the input optical fiber 120 will enter the output optical fiber 134.

The light beams enter the first isolator assembly 112, encountering the walk-off crystal 138. As the light beams travel through the walk-off crystal 138, the aligned polarization components 174 and 178 are displaced in the 45° direction, as indicated by the arrow in the lower left corner of FIG. 29. Again, the amount of displacement depends on the thickness of the walk-off crystal 138. Preferably, the thickness of the walk-off crystal 138 correlates to displacement of $a/\sqrt{2}$, where a is the distance from the center of one input optical fiber to the center of an adjacent input optical fiber.

As shown in FIG. 30, the polarization components 174 and 178 have been displaced to locations 186 and 188, respectively. Next, the polarization components 174, 176, 178 and 180 travel through the Faraday rotator 142, which rotates all of the polarization components in the counter-clockwise direction by 45° as shown in FIG. 31. The polarization components. 174, 176, 178 and 180 then travel through the half-wave plate 144, which further rotates the polarization components in the counter-clockwise direction by 45°, as shown in FIG. 32. The overall effect of the Faraday rotator 142 in conjunction with the half-wave plate 144 is a 90° rotation of the polarization components 174, 176, 178, and 180 in the counter-clockwise direction.

The polarization components 174, 176, 178 and 180 are combined by the walk-off crystal 140. The walk-off crystal 140 displaces the polarization components 176 and 180 to locations 186 and 188, respectively, combining the polarization components, as shown in FIG. 33. The combined polarization components exit the first isolator assembly 112 through the locations 182 and 184 on the walk-off crystal 140 and travel toward the lenses 170 and 172. The lenses 170 and 172 redirect the first and second light beams such that the relative positions of the first and second light beams are switched. In other words, the light beam from the input fiber 118 that was traveling to the left of the second light beam from the input fiber 120 is now traveling to the right of the second light beam. The lenses 170 and 172 may also focus the light beams that have been diverging as they traveled through the first isolator assembly 112.

Turning to FIG. 34, the polarization components 174, 176, 178 and 180 are focused and positioned to enter the second isolator assembly 114. Six new locations 194, 196, 198, 200, 202 and 204 are shown in FIG. 34. The polarization components 174 and 176, which were positioned to the left of the polarization components 178 and 180 at location 186 in FIG. 33, are now positioned to the right of the polarization components 178 and 180 at location 200 in position 70. The polarization components 178 and 180 are at location 198.

From the locations shown in FIG. 34, the polarization components 174, 176, 178 and 180 travel through the walk-off crystal 146. The polarization components 174 and 178 are displaced to locations 202 and 204 by the walk-off crystal 146, as shown in FIG. 35. Next, the polarization components travel through the Faraday rotator 150 and the half-wave plate 152. Together, the Faraday rotator 150 and the half-wave plate 152 rotate the polarization components 174, 176, 178 and 180 by 90° in the counter-clockwise direction, as shown in FIGS. 36 and 37. In FIG. 38, the polarization components 174, 176, 178 and 180 are recombined by the walk-off crystal 148. In addition, the polarization components 178 and 180 then enter the output optical fiber 134, positioned at location 202. The polarization components 174 and 176 enter the adjacent output optical fiber 136, positioned at location 204.

The rearward propagation of light beams from the output optical fibers 136 and 134 to the input optical fibers 118 and 120, respectively, is illustrated in FIGS. 39–48. The same reference numerals will be used for illustrating the various locations of the light beams along the multi-port optical isolator 168 in the rearward direction. In FIG. 39, a rearward propagating light beam having polarization components 206 and 208 exit the output optical fiber 136 and is about to enter the second isolator assembly 114 at location 204. In addition, a second rearward propagating light beam having polarization components 210 and 212 from the output optical fiber 134 is about to enter the isolator assembly 114 at location 202. Shown in FIG. 40, the polarization components 206–212 have traveled through the walk-off crystal 148. Walk-off crystal 148 displaces the polarization components 212 and 208 in the negative 45° direction, with respect to the positive y-axis direction, to locations 198 and 200, respectively.

After the walk-off crystal 148, the polarization components 206, 208, 210 and 212 encounter the half-wave plate 152. The polarization components 206, 208, 210 and 212 are rotated by 45° in the clockwise direction by the half-wave plate 152, as shown in FIG. 41. However, the polarization components are re-rotated by 45° in the counter-clockwise direction by the Faraday rotator 150. Again, due to the imperfect rotations by the Faraday rotator 150 and the half-wave plate 152, error polarization components 214, 216, 218 and 220 will be present following the passage through the Faraday rotator 150, as shown in FIG. 42. The error polarization components 214, 216, 218 and 220 represent portions of the polarization components 206, 208, 210 and 212 that are due to an error angle $\phi_3$ caused by the imperfect rotations by the half-wave plate 152 and the Faraday rotator 150.

In FIG. 43, the polarization components 214 and 218 have been displaced to locations 200 and 198, respectively, by the walk-off crystal 146. In addition, the polarization component 212 has been displaced to a new location 213. The polarization component 208 has also been displaced to a location below and to the right of location 200. Due to the fact that the polarization component 208 will not be transmitted to either input optical fibers 118 or 120, the polarization component 208 is not illustrated. Similarly, the polarization component 206, 210 and 212 will not be transmitted to either the input optical fiber 118 or the input optical fiber 120. Therefore, the polarization components 206 and 210 will not be illustrated in following figures.

Next, the polarization components 214, 216, 218 and 220 travel through the lenses 170 and 172 toward the first isolator assembly 112. In FIG. 44, the lenses 170 and 172 have inversely redirected the polarization components 214 and 216 from location 200 to location 186 and the polarization components 218 and 220 from location 198 to location 188. The redirected polarization components 214, 216, 218 and 220 then encounter the walk-off crystal 140. Entering the walk-off crystal 140, the polarization components 216 and 220 are displaced to locations 182 and 184, respectively, as shown in FIG. 45.

The polarization components 214, 216, 218 and 220 then travel through the half-wave plate 144 and the Faraday rotator 142. The half-wave plate 144 and the Faraday rotator 142 operate on the polarization components 214, 216, 218 and 220 in the same manner as the half-wave plate 152 and the Faraday rotator 150. As described above, additional error polarization components will be present after traveling through the half-wave plate 144 and the Faraday rotator 142 in the rearward direction. The effects of the half-wave plate 144 and the Faraday rotator 142 are illustrated in FIGS. 45 and 46.

Shown in FIG. 47 are error polarization components 222, 224, 226 and 228 that are due to an error angle $\phi_4$ caused by the imperfect rotations of the polarization components 214, 216, 218 and 220 by the half-wave plate 144 and the Faraday rotator 142. Next, the error polarization components 222, 224, 226 and 228 are displaced by the walk-off crystal 138 in the negative 45° direction, with respect to the positive y-direction. The polarization components 222 and 224 have been displaced to locations 182 and 184, respectively, as shown in FIG. 48. The polarization components 216 and 220 (not shown) have been displaced to locations below the locations 182 and 184. As stated above, the input optical fiber 118 and 120 are aligned with locations 182 and 184, respectively. Therefore, the polarization components 216 and 220 will not be transmitted to the input optical fibers 118 and 120. Similarly, the polarization components 214 and 218 will not be transmitted to the input optical fibers 118 and 120. Only the polarization components 222, 224, 226 and 228 will be transmitted to the input optical fibers 118 and 120. The polarization components 222, 224, 226 and 228 represent the $\sin^2\phi_4$ portion of the error polarization components 214, 216, 218 and 220.

Figure 49:
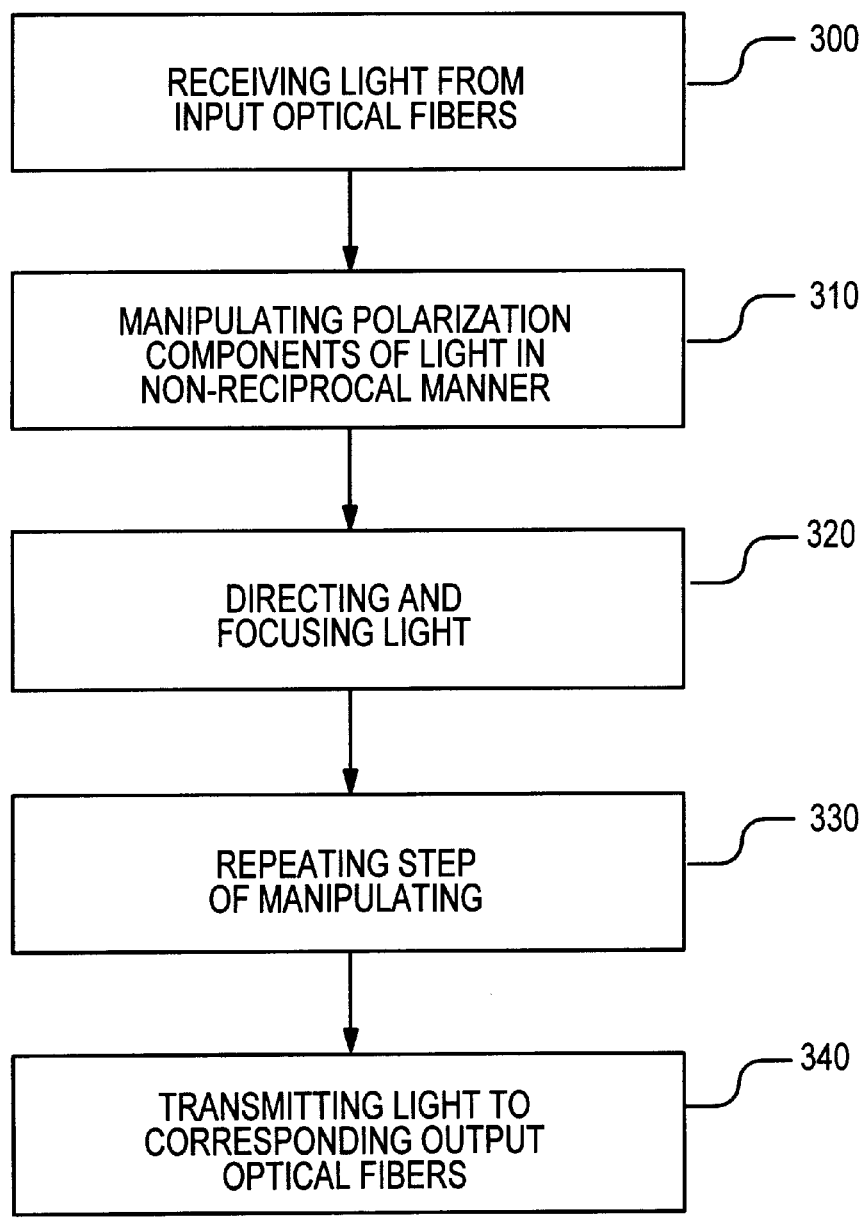
FIG. 49 is a flow diagram of a method of isolating propagation of light from multiple input optical fibers to multiple output optical fibers in accordance with the invention.

In FIG. 49, a flow diagram illustrating a method of isolating propagation of light from multiple input optical fibers to multiple output optical fibers utilizing a multi-port optical isolator having first and second isolator assemblies in accordance with the invention is shown. The first and second isolator assemblies consist of isolator chips. Preferably, each isolator chip includes a Faraday rotator and a half-wave plate that are positioned between two walk-off crystals. At step 300, the first isolator assembly receives substantially parallel light beams from the input optical fibers. Next at step 310, the first isolator assembly manipulates polarization components of the light beams propagating through the first isolator assembly. The manipulation involves separating the polarization components of a light beam, rotating the polarization components, and recombining the separated polarization components for forward propagating light beams. However, the first isolator assembly operates to achieve 0° rotation of polarization components of light beams propagating in the rearward direction such that the rearward propagating light beams do not couple back to the input optical fibers. If the first isolator assembly contains two isolator chips, the manipulation of polarization components is repeated.

At step 320, the light beams are directed and focused to locations on the second isolator assembly in order for the light beams to reach predetermined output optical fibers. The directing and focusing may involve inversely projecting the light beams by a first lens to a second lens. After step 330, the step of manipulating polarization components, i.e., step 310, is repeated by the second isolator assembly. Preferably, the second isolator assembly separates the polarization components by displacing one of the polarization components in a walk-off direction that is perpendicular to the walk-off direction of the first isolator assembly. Again, the step of manipulating polarization components is performed twice, if the second isolator assembly contains two isolator chips. Next, at step 340, the light beams are transmitted to corresponding output optical fibers.

What is claimed is:

1. A multi-port nonreciprocal optical apparatus comprising:
   a first isolator assembly and a second isolator assembly aligned in optical series to form an arrangement having an input port at a forward end for receiving a light beam and having an output port at a rearward end for emitting said light beam, each of said first and second isolator assemblies including:
      displacing means for separating first and second polarization components of said light beam propagating forwardly from said forward end to said rearward end;
      nonreciprocal means, disposed rearwardly of said displacing means, for rotating polarization components propagating therethrough, said rotating being nonreciprocal with respect to rotation of the forwardly propagating first and second polarization components relative to rearwardly propagating polarization components of light; and
      recombining means, disposed rearwardly of said nonreciprocal means, for combining said first and second polarization components;
   focusing means positioned between said first and second isolator assemblies for converging the forwardly propagating light beam,
   wherein said first and second isolator assemblies are positioned at angles θ and −θ, respectively, with respect to a propagating direction of said light beam through said focusing means to compensate for refractions when said light beam emanates from said first isolator assembly and when said light beam enters said second isolator assembly.

2. The apparatus of claim 1 wherein said displacing means and said recombining means of said first isolator assembly have a common walk-off direction that is generally perpendicular to a walk-off direction of said displacing means and combining means of said second isolator assembly.

3. The apparatus of claim 1 further comprising a third isolator assembly positioned adjacent to said first isolator assembly and a fourth isolator assembly positioned adjacent to said second isolator assembly.

4. The apparatus of claim 1 wherein said arrangement includes a plurality of input ports and a plurality of output ports, and wherein said focusing means includes a plurality of lenses, said input and output ports and said lenses providing propagation paths for light beams from input optical lines to predetermined output optical lines.

5. The apparatus of claim 4 wherein said plurality of lenses are micro-lenses formed on a substrate.

6. The apparatus of claim 1 wherein said nonreciprocal means includes a Faraday rotator and a half-wave plate.

7. The apparatus of claim 1 wherein said displacing means and said recombining means are walk-off crystals.

8. The apparatus of claim 7 wherein said walk-off crystals have thicknesses to accommodate said light beam emanating from a thermally-expanded core fiber.

9. The apparatus of claim 1 further comprising an optical line holder coupled to an input optical line, said optical line holder designed to position said input optical line at an angle θ with respect to the propagating direction of said light beam through said focusing means.

10. A nonreciprocal optical apparatus comprising:

a first isolator assembly having an input port to receive a light beam, said first isolator assembly including a first Faraday rotator and a first half-wave plate positioned between two first birefringent components, said two first birefringent components having a common walk-off direction;

a second isolator assembly in optical series with said first isolator assembly to receive said light beam from said first isolator assembly, said second isolator assembly having an emanating surface with an output port for transmitting said light beam received from said first isolator assembly, said second isolator assembly including a second Faraday rotator and a second half-wave plate positioned between two second birefringent components, said two second birefringent components having a common walk-off direction perpendicular to said common walk-off direction of said two first birefringent components; and focusing means situated between said first isolator assembly and said second isolator assembly for converging said light beams propagating from said first isolator assembly to said second isolator assembly.

11. The apparatus of claim 10 wherein said first isolator assembly and said second isolator assembly are positioned at angles θ and −θ, respectively, with respect to a propagating direction of said light beam through said focusing means to compensate for refractions when said light beam emanates from said first isolator assembly and when said light beam enters said second isolator assembly.

12. The apparatus of claim 10 further comprising a third isolator assembly positioned adjacent to said first isolator assembly and a fourth isolator assembly positioned adjacent to said second isolator assembly, each of said third and fourth isolator assemblies having a Faraday rotator and a half-wave plate positioned between two birefringent components.

13. The apparatus of claim 10 wherein said input port of said first isolator assembly is one of a plurality of input ports, wherein said output port of said second isolator assembly is one of a plurality of output ports, and wherein said focusing means includes a pair of cooperative lenses situated between said first isolator assembly and said second isolator assembly such that at least one of received light beams impinges upon said cooperative lenses at an off-axis location, said cooperative lenses being positioned in optical series to direct each of said received light beams from said first isolator assembly to a predetermined output port selected from said plurality of output ports.

14. The apparatus of claim 10 wherein said input port of said first isolator assembly is one of a plurality of input ports, wherein said output port of said second isolator assembly is one of a plurality of output ports, and wherein said focusing means includes a plurality of dedicated lenses situated between said first isolator assembly and said second isolator assembly, each of said dedicated lenses being positioned to coupled a light beam from a predefined input port to a corresponding output port.

* * * * *